(12) United States Patent
McRae

(10) Patent No.: US 12,052,530 B2
(45) Date of Patent: Jul. 30, 2024

(54) ELECTRONIC MONITORING SYSTEM USING VIDEO NOTIFICATION

(71) Applicant: Arlo Technologies, Inc., Carlsbad, CA (US)

(72) Inventor: Matthew McRae, Laguna Niguel, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 57 days.

(21) Appl. No.: 17/724,931

(22) Filed: Apr. 20, 2022

(65) Prior Publication Data

US 2022/0345669 A1 Oct. 27, 2022

Related U.S. Application Data

(60) Provisional application No. 63/178,846, filed on Apr. 23, 2021.

(51) Int. Cl.
*H04N 7/18* (2006.01)

(52) U.S. Cl.
CPC ............. *H04N 7/183* (2013.01); *H04N 7/188* (2013.01)

(58) Field of Classification Search
CPC ...... H04N 7/183; H04N 7/188; G06V 10/143; G06V 20/44; G06V 40/23; G06V 20/52; G08B 13/19684; G08B 13/19691
See application file for complete search history.

(56) References Cited

U.S. PATENT DOCUMENTS

| | | | |
|---|---|---|---|
| 10,304,302 B2 | 5/2019 | Aldover et al. | |
| 11,599,392 B1* | 3/2023 | Huang | G06V 10/17 |
| 2005/0091311 A1* | 4/2005 | Lund | G08B 13/19656 |
| | | | 348/E7.086 |
| 2009/0141939 A1 | 6/2009 | Chambers et al. | |
| 2016/0004390 A1* | 1/2016 | Laska | H04N 7/186 |
| | | | 715/723 |
| 2016/0364616 A1* | 12/2016 | Mclean | G06F 3/0346 |

FOREIGN PATENT DOCUMENTS

EP 3324628 A1 5/2018

\* cited by examiner

*Primary Examiner* — Ryan W Sherwin
(74) *Attorney, Agent, or Firm* — Boyle Fredrickson S.C.

(57) ABSTRACT

A camera-based monitoring system is provided that that, upon generation of an alert or notification, can provide a video clip formed from multiple frames or images to the notification system of a user-accessible monitoring device, such as a cell phone, to make it easy detect an object that is moving in the camera's field of view. Since the human eye is extremely sensitive to motion, the "triggering object" whose activities triggered image acquisition can be identified more easily, rapidly, and reliably from the video clip than from a still image. In addition to including the camera and detector(s), the system may include a base station and a controller. A method of operating such an electronic monitoring system also is disclosed.

21 Claims, 3 Drawing Sheets

ELECTRONIC MONITORING SYSTEM USING VIDEO NOTIFICATION

CROSS-REFERENCE TO A RELATED APPLICATION

This application claims the benefit of provisional patent application U.S. App. No. 63/178,846, filed on Apr. 23, 2021 and entitled "ELECTRONIC MONITORING SYSTEM USING VIDEO NOTIFICATION", the entire contents of which are hereby expressly incorporated by reference into the present application.

BACKGROUND OF THE INVENTION

1. Field of the Invention

The present invention relates to an electronic monitoring system, and more particularly, to an electronic monitoring system in which detection of a triggering event causes a notification in the form of a video clip to be sent to a user-operated monitoring device.

2. Discussion of the Related Art

Cameras have long been used as part of monitoring and/or surveillance systems. More recently, cameras have been coupled with electronic sensors to detect triggering events, such as a detected motion, to initiate image capturing and recording of an area once a triggering event has occurred. Video cameras have also been connected to computers with network access to allow a user to remotely monitor an area with a user-operated monitoring device such as a PC or laptop computer, a smart phone, or a tablet computer. In such systems, alerts such push notifications (all referred to herein as "notifications" for the sake of conciseness) can be sent to alert a user of the monitoring device of the existence of an event of potential interest. Upon receiving notification, the user can interface with the monitoring device to interact with video cameras and/or other aspects of the monitoring system. This interface may involve operating an application or program on the monitoring device or, in more sophisticated systems, simply interfacing with a virtual button or other feature whose access is enabled by the notification.

The notification received by the user's monitoring device typically is in the form of a single still image, usually coupled with a text message such as "MOTION DETECTED AT FRONT DOOR." While the addition of an image in a notification permits users to visually see what may have triggered the notification, it is difficult in many cases do discern which particular object or "candidate object" in an image was the actual "triggering object" that triggered the notification. For example, in the case of a "cluttered" image containing several candidate objects in a frame, it may be impossible to tell from a single image which of the candidate objects in the frame was the moving "triggering object." This difficulty is exacerbated at night or under other low-visibility conditions in which it may be difficult for a user to easily differentiate a particular object from other object(s) in the fame.

Markers have been employed to draw the user's attention to an object in an image that is determined to have triggered the image capture and recording. Such markers may, for example, take the form of shading or arrows that are intended to mark the object that caused the triggering effect. A "bounding box" is one such marker. A bounding box typically is a literal shape, such as a rectangle, overlayed over a portion of image that contained the pertinent object at the time of the triggering event and intended to surround the object. Such a bounding box is disclosed, for example, in U.S. Pat. No. 10,304,302, entitled ELECTRONIC MONITORING SYSTEM USING PUSH NOTIFICATIONS and assigned to the Arlo Technologies, Inc, the contents of which are hereby incorporated by reference in their entirety.

Bounding boxes and similar markers only designate a portion of the displayed static image. They are not particularly useful if the marked object is difficult to see in the still image because of low light or other conditions and/or if the bounding box also surrounds part or all of one or more other objects in the vicinity of the object that caused the triggering event.

The need therefore has arisen to provide a monitoring system and method that, upon the detection of triggering event, is capable of sending a visual notification to a user's cell phone or other monitoring device in a manner that permits the user to reliably visually identify the triggering object that caused the triggering event.

SUMMARY OF THE INVENTION

In accordance with a first aspect of the invention, this need is satisfied by providing a monitoring system that, upon detecting a triggering event, can send a video clip formed from multiple frames or images to the notification system of a user-accessible monitoring device, such as the screen of a mobile phone, to make it easy to detect an object that is moving in the camera's field of view. Since the human eye is extremely sensitive to motion, the triggering object whose activities triggered image capture can be detected more easily, rapidly, and reliably from the video clip than from a still image.

The system may include an imaging device that includes one or more detectors configured to detect a triggering event occurring in an area monitored by the imaging device and to capture visual image frames of the monitored area. The system additionally includes a controller in communication with the imaging device. The controller is configured to execute a program stored in a non-transitory medium to send a notification in the form of a video clip to a monitoring device upon detection of a triggering event.

The video clip could be formed from raw (unedited) captured frames or from frames that have been filtered or otherwise processed or edited. The video clip may or may not be formed from sequentially-captured frames.

The video clip may have a duration of, or example, three-to-ten frames.

The imaging device may comprise a video camera having internal memory and having a motion sensor that is configured to detect motion forming the triggering event. In this case, the camera may be configured to capture and transmit a multi-frame video data stream forming the basis of the video clip. The system may additionally include a base station communicating with the camera and with the monitoring device. In this case, the controller may be contained at least in part within the base station. In addition, the controller may be contained in part in the video camera(s), a server in communication with the base station, and/or the monitoring device.

In accordance with another aspect of the invention, a method of operating a monitoring system includes detecting a moving object in the imaging system's "field of view" or area monitored by an imaging device. This detection may be performed by one or more motion sensors or by other sensors, such as IR sensors or microphones, capable of detecting a moving object in the device's field of view. Then, upon this detection, a camera, which may be part of the imaging device, captures a series of visual image frames of the monitored area. The method also automatically displays a notification on a display of a user-operated monitoring device, such as a cell phone, that includes a video clip formed by or produced from image frames captioned by the camera.

The video clip may have a duration of three to ten frames.

The method may additionally include selecting, as a basis of the video clip, a designated number of sequentially-captured frames captured after detection of the triggering event.

Alternatively, the method may include selecting, as a basis of the video clip, a plurality of captured frames that may or may not be sequentially-captured frames. In this case, the selected frames may be ones that are determined to be optimal examples of detected motion of the moving object. Alternatively, the selected frames may be selected based on detected image characteristics of the moving object. In either case, selection may be performed by computer vision or artificial intelligence.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Exemplary embodiments of the invention are illustrated in the accompanying drawings in which like reference numerals represent like parts throughout, and in which.

DETAILED DESCRIPTION

Figure 1:
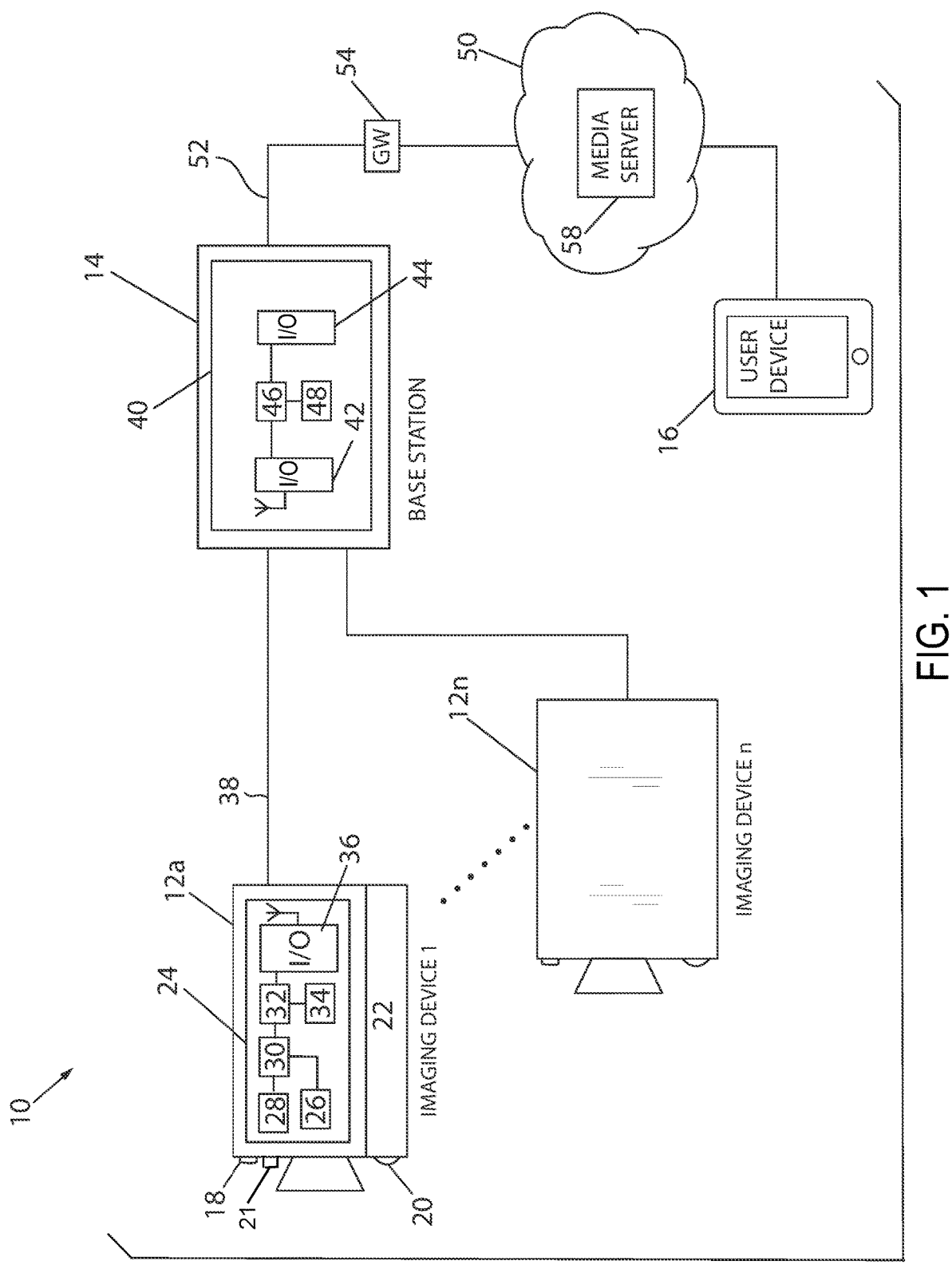
FIG. 1 is a schematic view an electronic monitoring system constructed in accordance with the invention.

Referring now to FIG. 1, an electronic system 10 constructed in accordance with the invention includes one or more imaging devices 12 and a hub or base station 14. A number "n" 12a-12n of images devices are schematically illustrated in FIG. 1. Each imaging devices 12 may be battery powered or wired. One or more user devices 16, such as a smart phone, tablet, laptop, or PC, communicates with the base station 14. Each user device 16 includes a display that typically includes both an audio display and a video display, internal computing and storage capabilities, and a program or application servicing as a user interface with the remainder of the system 10. In the case of a smart phone or a tablet, the display may include a touch screen.

Each imaging device 12 is configured to acquire data and to transmit it to the base station 14 for further processing and/or transmission to a server and/or the user device(s)16. The acquired data typically will correspond to a video image, and each imaging device 12 may be or include a camera such as a video camera. Several such imaging devices 12 may be mounted around a building or other structure or area being monitored. For example, in the case of a residential home, imaging devices 12 could be mounted by each entrance and selected windows, and even on a gate or light pole. An imaging device 12 also could be incorporated into or coupled to a doorbell, floodlight, etc.

Still referring to FIG. 1, one or more of the imaging devices 12 may also include a microphone 18, visible and/or infrared (IR) lights 20, a power supply 22, and/or imaging device electronic circuitry 24. Circuitry 24 may include an imager 26, an audio circuit 28, a media encoder 30, a processor 32, a non-transitory memory storage 34 and/or a wireless I/O communication device 36, among other things. Each imaging device 12 can communicate with the base station 14 through a network such as a private Wireless Local Area Network (WLAN) 38, hosted by the base station 14 operating as an access point. One such network is an IEEE 802.11 network. One or more of the imaging devices also could have other devices or components such as a speaker, an alarm, smoke or CO detectors, etc.

Still referring to FIG. 1, the hub or base station 14 can include base station electronic circuitry 40 including a first wireless I/O communication device 42 for communicating with the imaging devices 12 over the WLAN 38, a second wired or wireless I/O communication device 44 for accessing the Wide Area Network (WAN) 50, such as the Internet through a Local Area Network (LAN) 52 connected to a Gateway and/or Router 54, a processor 46 and/or a non-transitory memory storage 48, among other things. It should be apparent that "circuitry" in the regard can comprise hardware, firmware, software, or any combination thereof. In one aspect, the imaging devices 12 could be Arlo® cameras, and the base station 14 could be an Arlo base station, each available on a stand-alone basis or as part of any of a number of systems available from Arlo Technologies, Inc. of Carlsbad, California Each imaging device also has or connected to one or more detectors capable of detecting a triggering event as discussed below.

The base station 14 may also be in communication with a sever 58, which may be a cloud-server accessible via the WAN 50. The server 58 can include or be coupled to a microprocessor, a microcontroller or other programmable logic element (individually and collectively considered "a controller") configured to execute a program. The controller may be contained in whole in the base station 14 or the server 58. Alternatively, interconnected aspects of the controller and the programs executed by it could be distributed in various permutations within the imaging device 12, the base station 14, the monitoring device 16, and the server 58. This program may be utilized in filtering, processing, categorizing, storing, recalling and transmitting data received from the imaging device 12 via the base station 14. Server 58 may also be in communication with or include a computer vision program ("CV"), which can apply one or more filters or processes, such as edge detection, facial recognition, motion detection, etc., to detected one or more characteristics of the recording such as, but not limited to, identifying an individual, animal, vehicle, or package present in the recording. The base station also may be eliminated in its entirety, in which case the imaging device 12 would communicate with the external server 58 via the gateway router 54, and the circuitry in the base station would be contained in whole or in part in the imaging device 12, the gateway router 54, and/or the server 58.

In operation, each imaging device 12 can be configured, though suitable mounting of the imaging device 12 and/or through suitable manipulation of its controls, to monitor an area of interest, such as a part of a building or section of property. An imaging device 12 may capture an image upon receipt of a command from a monitoring device 16. An image also may be captured automatically upon detection of a triggering event detected by a detector, which may be a standalone detector in communication with the imaging device 12 and/or the base station 14, or which may be on or in the imaging device 12 as illustrated at 21. The triggering event may be motion of a triggering object, and the detector may be a motion detector. Instead of or in addition to detecting motion, the detector could include an IR sensor detecting heat, such as the body heat of an animal or person. The triggering event also could be sound, in which case the detector may include the microphone 18. In this case, the triggering event may be a sound exceeding a designated decibel level or some other identifiable threshold. It is also possible to limit triggering events to detection of a certain class of object, such as an automobile, a person, a package, or an animal Detection of other types of objects would not trigger image capture and recording. Upon receiving notification from an imaging device 12 of a triggering event, the system 10 can generate a push notification ("PN") or other alert or notification and send it to one or more user devices 16 for indicating the triggering event.

Whether camera operation is triggered by a command from a monitoring device 16 or by detection of a triggering event by a detector, the camera 24 can then capture a raw video stream which, in turn, can be provided to the media encoder 30 for producing video packets in an encoded video stream. The stream is at least conceptually formed of a number of sequentially-captured frames of the monitored area. Similarly, the microphone 18 and the audio circuit 28 can capture a raw audio stream which, in turn, can be provided to the media encoder 30 for producing audio packets in an encoded audio stream. Accordingly, the video and/or audio packets, referred to herein as "media" packets, are provided in an encoded media stream. Under control of the controller executing the program, the encoded media stream can be transmitted from the wireless I/O communication device 36 to the base station 14.

The media stream may then be transmitted via the WAN 50 to a remote data storage device in communication with a media server 58 for data storage and processing. The storage device may be a cloud-based storage device, and the media sever 58 may be a cloud server accessible via a wireless connection. A CV may apply one or more filters or processes, such as edge detection, facial recognition, motion detection, etc., to detect one or more characteristics of the recording such as, but not limited to, identifying an individual, animal, vehicle, or package present in the recording. A filtered or otherwise processed image can then be displayed on the monitoring device 16, along with additional visual and/or audio messaging such as a text and/or audio message identifying a generic or particular person or object. The image can be transmitted in the form of frames corresponding to or derived from (via filtering and other processing) of the frames transmitted by the imaging device 12 in the media packets. Alternately, as mentioned above, data storage and processing functions could be performed in combinations of the imaging device 12, the base station 14, and even the monitoring device 16.

Figure 2:
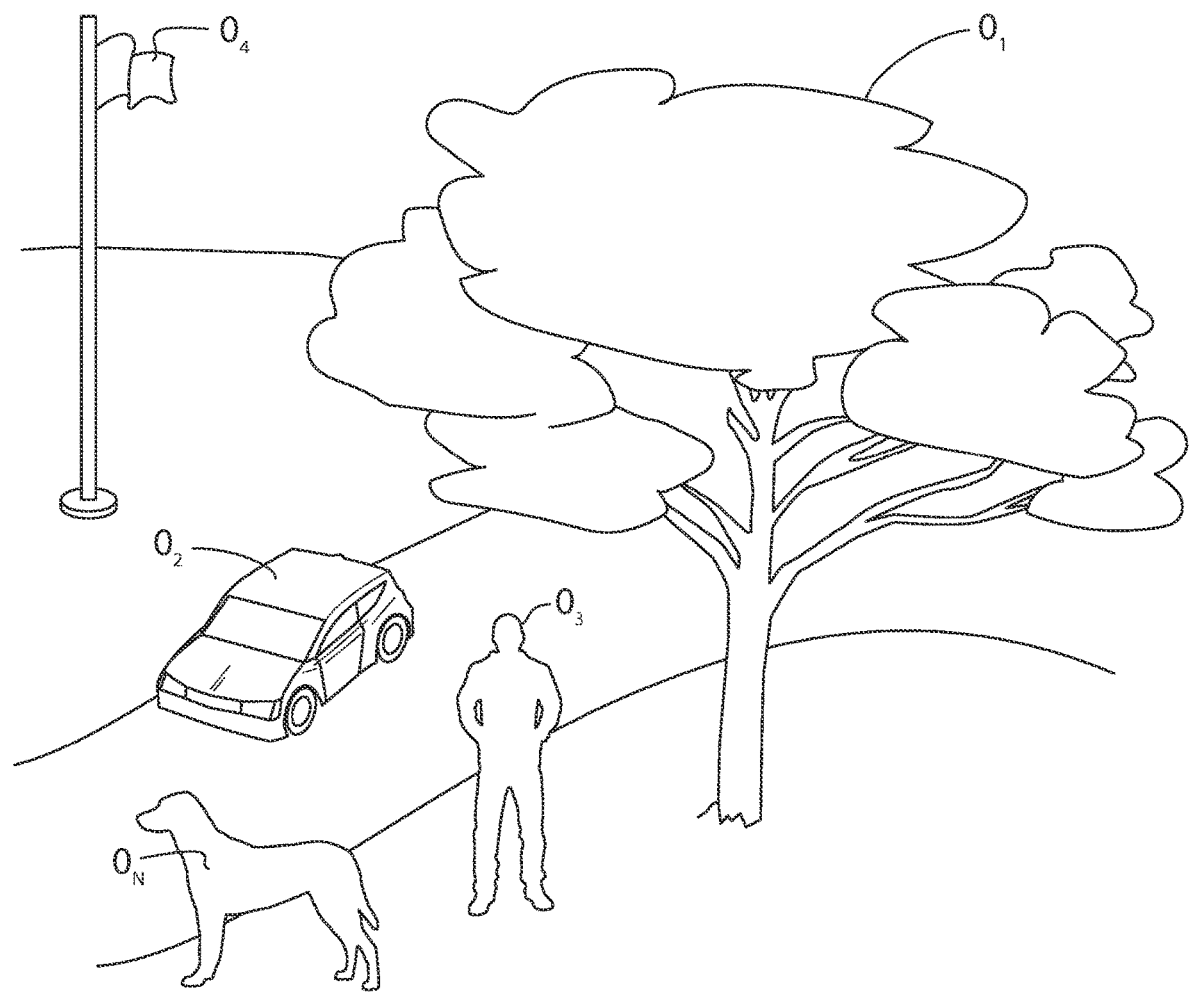
FIG. 2 schematically shows a frame of an image of a monitored area captured by a camera of the system of FIG. 1.

A typical image captured by the imaging device is shown schematically in FIG. 2. Contained within the image are a number of objects $O_1$ to $O_N$ including a tree $O_1$, an automobile $O_2$ a person $O_3$ a flag $O_4$, and an animal $O_N$. If the system lacks the ability to classify objects and limit a triggering event to the detection of a particular class of object, such as a vehicle or a person, a motion-based triggering event could be generated by any of these "candidate" objects, including movement of the automobile, person, or animal, swaying of the tree, or flapping of the flag. Even if the system has such classification ability through the use of CV or AI, low-light or other low visibility conditions may degrade the system's ability to classify objects. Still further, if more than one object of a given class were present, such as two or more people, movement of any one of the members of this class could trigger image capture and user notification. Stated more succinctly, multiple candidate objects may exist even with systems configured to notify the user only upon detection of a particular class of object. In a still image, it could be difficult or impossible for a user of a monitoring device 16 to determine from viewing a still image on the screen of the device 16 which of these "candidate" objects is the "triggering object" that triggered the motion sensor, especially under conditions of low-light or other poor visibility and/or in a cluttered image having a large number of candidate objects.

The present invention recognizes that fact that human eyesight is extremely sensitive to motion and can quickly identify a change of a scene over even brief periods of time on the order of a few frames. If the notification displayed on the screen of the monitoring device 16 includes more than one frame in the form of a short video clip or an animated GIF style playback, the user can quickly and easily see what was moving frame by frame and to quickly identify which candidate object is the triggering object that triggered the motion sensor.

Figure 3:
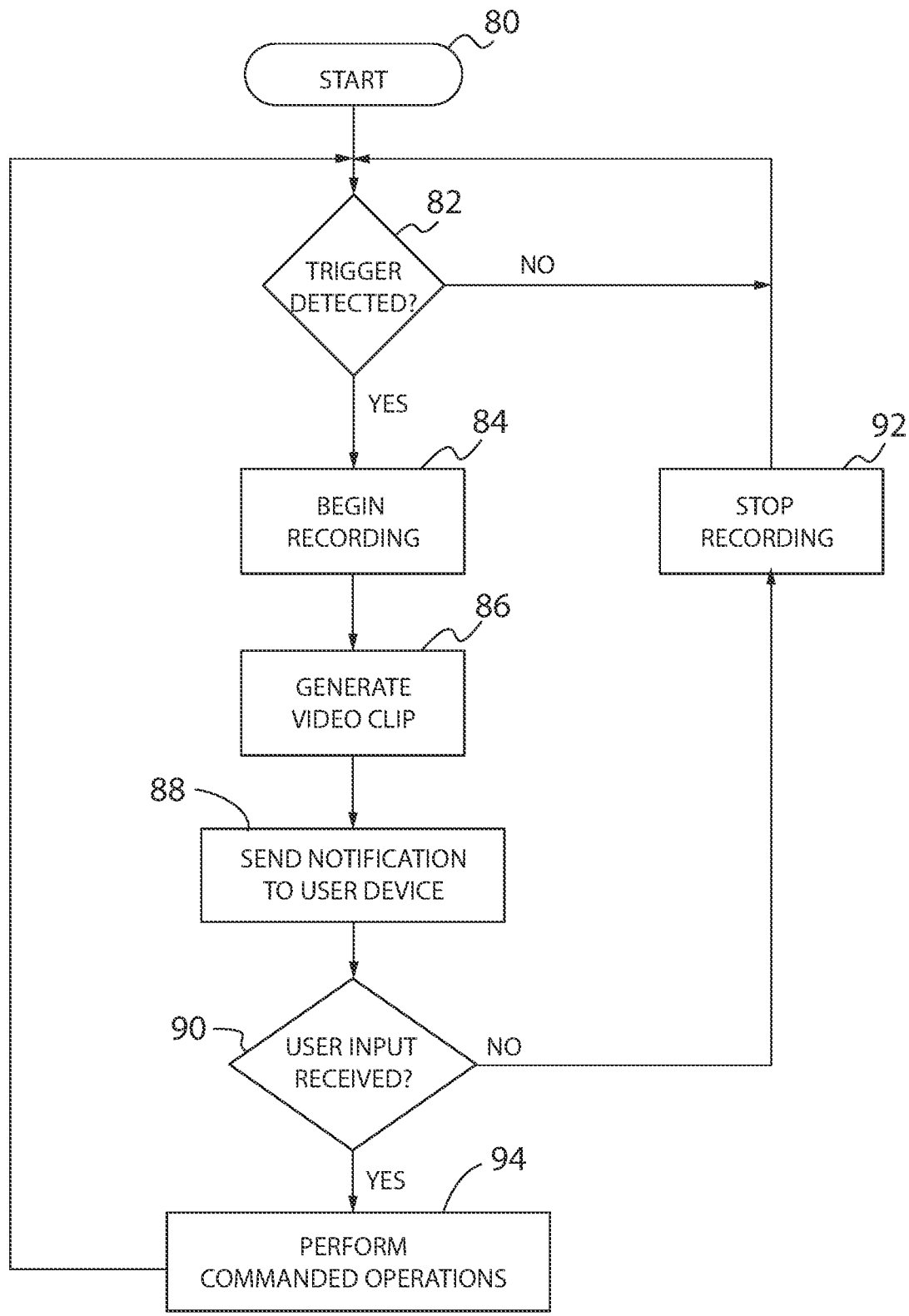
FIG. 3 is a flowchart illustrating the generation and display of a multi-frame video notification displayed by the system of FIG. 1.

The notification process is shown schematically in the flowchart of FIG. 3. Following initialization of the imaging device 12 and base station 14 at Block 80, the imaging devices 12, and/or sensors or detectors coupled to them and/or to the base station 14, can monitor for triggering events, such as motion or sound produced by an object or class of objects, for example, using cameras 24, microphones 26 and/or motion sensors 28, in various configurations, including as described above with respect to FIG. 1. Motion sensing is most practical for the instant application, but it is by no means essential or exclusive. As mentioned above, it is possible to limit a triggering event to the detection of a particular type or class of object, such as a person, animal, vehicle, etc. The monitoring without additional action can continue in a continuous loop so long as no triggering events are detected ("NO"). However, if an imaging device 12 detects a triggering event ("YES") in Block 82, the imaging device 12 can begin image capture and recording at Block 84.

Next, at Block 86, the controller generates a multi-frame display or "video clip" to be included in the notification that ultimately will be displayed on the screen of the monitoring device 16. The displayed frames could be a number of still images or snapshots or, more typically, a number of frames of a video image. The term "video clip" is used herein as a generic term encompassing both types of displays. The frames forming the video clip could be delivered raw from the imaging device 12. More typically, however, the captured frames forming the basis of the video clip will be filtered and otherwise processed as described above before the video clip is generated and displayed.

The number of frames in the video clip, and thus the temporal length of the video clip, may vary based on a variety of factors including designer preference and the methodology employed for frame selection. For example, the minimum number of frames to be contained in clip may be driven by the length of the detected triggering event. So, if the triggering event is of a relatively short duration, it would be desirable to select representative frames that omit pre-roll or post object motion frames. As discussed in more detail below, if CV or a more advanced algorithm is used, it may be possible to select only the "best" frames suitable for display. As a practical matter, the clip likely will include at least three frames, with human-eye based motion detection being facilitated by looping the clip as an animated GIF. The maximum number of frames to be included in a clip is limited only by the bandwidth usage the designer wishes to tolerate and the latency for the notification that the designer is willing to accept. Sending more frames than necessary would result in delay of notification receipt by the user until all frames are received by the monitoring device 16. Finally, the operating system employed by the monitoring device could impose bandwidth or other limitations on the number of frames optimally contained in a clip. As a practical matter, a clip length of ten frames or less likely would satisfactorily avoid all of these concerns. A standard GIF is six frames, so a user might consider a six-frame video clip to be particularly familiar.

The particular captured frames to be included in or to form the basis of the video clip may be simply a number of frames that are sequentially captured after the triggering event, typically beginning with the first frame captured after the triggering event. More sophisticated techniques for frame selection are descried below.

Next, a notification containing the video clip is displayed on the screen of the monitoring device 16 in Block 88. The notification may take the form of a push notification. The notification may show the video clip only once or cycle the clip for so long as the notification is active, such as occurs with the display of a standard animated GIF. The displayed notification could include any of a number of components in addition to the video clip. For example, the notifications could include graphical elements or a text message providing a generic message such as "MOTION DETECTED AT FRONT DOOR" or a more specific message such as "PERSON DETECTED AT REAR DOOR." The message could be more specific still, such as in identifying a specific type of person "DELIVERY PERSON" or even a specific person or object "BILL" or "BILL'S CAR." The displayed notification also could include audio aspects, such as a ring or a chime, or even a voice notification conveying the same or different information delivered by text.

If earliest possible notification is of interest, the process may display a still image on the screen of the user device 16 as soon as motion is detected and an image is captured, and follow with a video image in a brief period of time, typically less than a few seconds, when the GIF or other video is available. Hence, the video clip need not be the only or even the first visual notification displayed by the monitoring device 16 as part of the notification.

Next, in Block 90, the controller determines whether not the user reacts to the notification by interfacing with the monitoring device 16 within a designated time limit of, for example, 5-30 seconds. If "NO", the process proceeds to Block 92, where the imaging device 12 stops recording and is placed back into sleep or monitoring mode pending detection of another triggering event. If "YES", the system 10 may perform any of a number of possible actions selectable by the user, depending on the configuration and capabilities of the particular system. For example, the user may simply instruct the system 10 to ignore the notification, as could be the case, for example, if the triggering object were a swaying tree or a waving flag. In this case, the notification would stop being displayed on user device 16, and the imaging device 12 would stop recording and return to sleep or monitoring mode. The user also could interface with the user device 16 to instruct the imaging device 12 to display an audio or visual alarm, or to simply open a voice communication channel with the imaging device 12. As still another example, the user could initiate a call to an individual or emergency services. In any event, the system 10 will continue to monitoring for another triggering event. Depending on the option selected by the user and the configuration of a particular system, the notification may be turned off, and/or recording may cease.

As mentioned above, techniques may be employed to optimize the frames displayed in the video clip contained in the notification for triggering object recognition. The captured frames that are selected for the frames included in the video clip may or may not be sequentially captured frames. Any of a number of computer vision and/or AI techniques could be used to select the optimal frames to include in the video clip.

In one example, the monitored motion can be recorded for a period of time, for example, 10-20 frames, and some of those frames may be selected by the controller to show optimal examples of the detected motion. Computer vision may be employed for this task. For example, the processing software can identify the clearest 3-10 of the first 10-20 frames that are captured upon the triggering event and include only those frames in the video clip. Alternatively, frames in which the triggering object has not moved between frames could be omitted.

As another example, frame selection could be based on detected image characteristics to provide the best view of the triggering object. For example, if the triggering object is a person, computer vision may be employed to identify the frames that best show the person's face, and the video clip could be limited to those frames.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. An electronic monitoring system comprising:
an imaging device configured to respond to a detected triggering event generated by a moving triggering object occurring in an area monitored by the imaging device by capturing visual image frames of the monitored area, the image including the moving triggering object and at least one additional object; and
a controller in communication with the imaging device, the controller being configured to execute a program stored in a non-transitory medium and to automatically send a notification to a user-accessible monitoring device upon detection of a triggering event generated by an object, wherein the notification includes a video clip of the monitored area that is formed by or from some of the captured frames, the video clip having a maximum of 10 frames and having a number of frames that is set to be sufficient to permit a user viewing the monitoring device to identify the triggering object as such.

2. The electronic monitoring system of claim 1, wherein the video clip has a duration of at least three frames.

3. The electronic monitoring system of claim 1, wherein the video clip has a duration of from three to 10 frames.

4. The electronic monitoring system of claim 1, wherein the triggering event is motion of the triggering object, wherein the imaging device comprises a video camera having internal memory, and further comprises a motion sensor that is configured to detect motion of the triggering object, wherein the camera is configured, in response to operation of the motion sensor, to capture and transmit a multi-frame video data stream.

5. The electronic monitoring system of claim 4, wherein the system additionally includes a base station communicating with the imaging device and with the monitoring device, and wherein the controller is contained at least in part within the base station.

6. The electronic monitoring system of claim 5, wherein the controller is contained in part in at least one of the imaging device, a server in communication with the base station and/or the imaging device, and the monitoring device.

7. The electronic monitoring system of claim 1, wherein the controller is configured to determine which of the captured frames is to be contained in or form the basis of the video clip contained in the notification.

8. The electronic monitoring system of claim 7, wherein the controller is configured to select a designated number of sequentially-captured frames captured immediately after detection of the triggering event.

9. The electronic monitoring system of claim 7, wherein the controller is configured to select captured frames determined by the controller to be optimal examples of the detected motion, wherein the captured frames may or may not be sequentially-captured frames.

10. The electronic monitoring system of claim 9, wherein the controller is configured to select captured frames based on detected image characteristics so as to provide an optimal view of the triggering object.

11. The electronic monitoring system of claim 1, wherein the controller is further configured, in response to a user command issued upon display of the notification, to perform a specified action including 1) cessation of the display of the notification on the monitoring device, 2) display an alarm on the monitoring device, and 3) contacting emergency services.

12. The electronic monitoring system of claim 1, wherein the monitoring device is a smart phone, and the video clip is in the form of a GIF which is repeated in a loop.

13. An electronic monitoring system comprising:
an imaging device including internal memory, a video camera configured to capture and transmit a video image stream, and a motion detector configured to detect movement of a triggering object in an area monitored by the imaging device;
a base station in communication with the imaging device; and
a controller contained at least in part within at least one of the imaging device and the base station, the controller being configured to, upon detection movement of the triggering object by the motion detector, execute a program stored in a non-transitory medium to automatically send a video clip of the monitored area to a user-accessible monitoring device having a screen capable of displaying video images, the video clip having a maximum of 10 frames and having a number of frames that are set to be sufficient to permit a user viewing the monitoring device to identify the triggering object as such.

14. The electronic monitoring system of claim 13, wherein the video clip lasts from three to ten frames.

15. A method comprising:
detecting a triggering event by a moving triggering object in an area monitored by an imaging device; and
in response to detection of the triggering event,
using a camera of the imaging device, capturing a series of visual image frames; and
automatically displaying a notification on a display of a user-operated monitoring device, the notification comprising a video clip formed by or produced from frames captured by the camera, the video clip having a maximum of 10 frames and having a number of frames that is set to be sufficient to permit a user viewing the monitoring device to identify the triggering object as such.

16. The method of claim 15, wherein the video clip has a duration of three to ten frames.

17. The method of claim 15, further comprising selecting, as a basis of the video clip, a designated number of sequentially-captured frames captured after detection of the triggering event.

18. The method of claim 15, further comprising selecting, as a basis of the video clip, a plurality of captured frames that may or may not be sequentially-captured frames.

19. The method of claim 15, wherein the triggering event is movement of the triggering object.

20. The method of claim 19, wherein the selected frames are determined to be optimal examples of detected motion of the triggering object.

21. The method of claim 20, wherein the selected frames are selected based on determined image characteristics of the triggering object.

* * * * *